United States Patent
Wang et al.

(10) Patent No.: US 12,500,806 B2
(45) Date of Patent: Dec. 16, 2025

(54) FLOW OPTIMIZATION METHOD FOR NON-REAL-TIME DECODING SYSTEMS

(71) Applicant: Realtek Semiconductor Corp., Hsinchu (TW)

(72) Inventors: FengXiang Wang, Suzhou (CN); YiQi Jiang, Suzhou (CN)

(73) Assignee: REALTEK SEMICONDUCTOR CORP., Hsinchu (TW)

( * ) Notice: Subject to any disclaimer, the term of this patent is extended or adjusted under 35 U.S.C. 154(b) by 454 days.

(21) Appl. No.: 18/338,549

(22) Filed: Jun. 21, 2023

(65) Prior Publication Data

US 2024/0146596 A1 May 2, 2024

(30) Foreign Application Priority Data

Nov. 1, 2022 (CN) .......................... 202211353612.X (51) Int. Cl.
*H04L 27/26* (2006.01)
*H04L 25/02* (2006.01)
*H04L 25/03* (2006.01)

(52) U.S. Cl.
CPC ...... *H04L 27/2649* (2013.01); *H04L 25/0224* (2013.01); *H04L 25/03866* (2013.01)

(58) Field of Classification Search
CPC .......... H04L 27/2649; H04L 25/03866; H04L 25/0224
See application file for complete search history.

(56) References Cited

U.S. PATENT DOCUMENTS 8,085,873 B2 12/2011 Bjerke et al.

FOREIGN PATENT DOCUMENTS

CN 101364961 A 2/2009
CN 104202129 A 12/2014
(Continued)

OTHER PUBLICATIONS

Kanj, et al.: "A Tutorial on NB-IoT Physical Layer Design"; IEEE Communications Surveys & Tutorials, vol. 22, No. 4, Fourth Quarter 2020; pp. 2408-2446.
(Continued)

*Primary Examiner* — Natasha W Cosme
(74) *Attorney, Agent, or Firm* — McClure, Qualey & Rodack, LLP (57) ABSTRACT

Disclosed is a flow optimization method for non-real-time decoding systems, which is applied in a wireless communication system including a transmitter and a receiver corresponding thereto. The receiver executes the non-real-time decoding method, which includes the following steps: after determining that a current subframe is a non-real-time decoding subframe, performing a NRS channel estimation of the non-real-time decoding subframe, and storing frequency domain data of the current subframe; after determining that the current subframe is a subsequent subframe adjacent to the non-real-time decoding subframe, combining the NRS channel estimation of the non-real-time decoding subframe and a NRS channel estimation of the subsequent subframe on the subsequent subframe, and then performing a data resource element channel estimation; and according to the data resource element channel estimation obtained from the combined NRS channel estimation, performing equalization, descrambling and de-rate matching on the non-real-time decoding subframe and the subsequent subframe respectively.

20 Claims, 6 Drawing Sheets

(56) References Cited

FOREIGN PATENT DOCUMENTS

CN        106961403 A    7/2017
TW         I383626 B     1/2013

OTHER PUBLICATIONS

Zhang, et al.: "An Efficient Downlink Receiver Design for NB-IoT"; 978-1-7281-3106-1/20/$31.00 copyright 2020IEEE; pp. 1-6.
Cho, et al.: "MIMO-OFdm Wireless Communications with MATLAB"; IEEE Press; copyright 2010; pp. 1-456.
"A sidelink is used for ProSe direct communication and ProSe direct discovery between UEs"; 3GPP TS 36.211 V15.14.0 (Sep. 2021); pp. 189-238.
"System information acquisition time reduction for NB-IoT"; 3GPP TSG-RAN WG1 Meeting #91 R1-1719360 Reno, Nevada, USA Nov. 27 to Dec. 1, 2017; pp. 1-14.
"Reduction of NB-IoT system information acquisition time"; 3GPP TSG RAN WG1 Meeting #92bis R1-1803878 Sanya, China, Apr. 16-20, 2018; pp. 1-6.
"14 UE procedures related to Sidelink"; 3GPP TS 36.213 V15.15.0 (Sep. 2021); pp. 481-537.
"3GPP TSG RAN WG1 Meeting #88 R1-1704068 Athens, Greece Feb. 13-17, 2017"; pp. 1-2.
"Reduction of NB-IoT system information acquisition time"; 3GPP TSG RAN WG1 Meeting #92 R1-1801445 Athens, Greece, Feb. 26-Mar. 2, 2018; pp. 1-14.
3rd Generation Partnership Project; Technical Specification Group Radio Access Network; Evolved Universal Terrestrial Radio Access (E-UTRA); Physical channels and modulation (Release 17); 3GPP TS 36.211 V17.2.0 (Jun. 2022); pp. 1-250.

FLOW OPTIMIZATION METHOD FOR NON-REAL-TIME DECODING SYSTEMS

CROSS REFERENCE TO RELATED PRESENT DISCLOSURE

This application claims the priority benefit of Chinese Patent Application Serial Number 202211353612.X, filed on Nov. 1, 2022, the full disclosure of which is incorporated herein by reference.

BACKGROUND

Technical Field

The present disclosure relates to a wireless communication technology which in particular benefits a non-real-time wireless communication system, and related circuits.

Related Art

It is the constant pursuit of the communication system to reduce cost and improve receiver performance. Reducing cost can directly reduce power consumption, while improving receiver performance can reduce the number of retransmissions and indirectly reduce power consumption. This requirement is particularly strong in low-power wide area networks that have strict requirements on power consumption.

The present disclosure focuses on a system that does not need to output a decoding result immediately in the current subframe. Through fully utilizing of the characteristics of the system, the channel estimation performance of some data blocks is improved, and the performance is improved while processing cost is reduced.

There have been some previous attempts to improve the performance of such systems. For example, the literature "Reduction of NB-IoT system information acquisition time" is to improve performance through symbol-level coherent combination. The symbol-level combination can modify the SNR (Signal to Noise Ratio) of received data, which in turn improves channel estimation. However, this idea is limited to the case when repeating data is the same. If the data on two subframes is not simply repeated, the symbol-level combination cannot be performed before channel estimation and equalization.

There are other ideas for optimizing channel estimation. For example, it is mentioned that the number of combined subframes for channel estimation can be increased in the literature "LS reply on NB-IoT SI acquisition delay", but the gain of combining subframes with longer intervals is greatly reduced when the channel is fast fading or there is a residual frequency offset.

Based on these considerations, it is indeed a necessity to further propose a better solution for the non-real-time decoding system.

SUMMARY

The embodiments of the present disclosure provide a non-real-time decoding system and a method thereof, which is more applicable to systems when the data on the two subframes is not simply repeated than the symbol-level combination before channel estimation and equalization, and less sensitive than combining subframes with longer intervals when channel is fast fading or there is a residual frequency offset.

In order to solve the above-mentioned technical problems, the present disclosure is implemented as follows.

The present disclosure provides a non-real-time decoding method, which is applied in a wireless communication system. The wireless communication system includes a transmitter and a receiver corresponding thereto, and the receiver executes the non-real-time decoding method, which includes the following steps: after determining that a current subframe is a non-real-time decoding subframe, performing a narrowband reference signal (NRS) channel estimation of the non-real-time decoding subframe, and storing frequency domain data of the current subframe; after determining that the current subframe is a subsequent subframe adjacent to the non-real-time decoding subframe, combining the NRS channel estimation of the non-real-time decoding subframe and a NRS channel estimation of the subsequent subframe on the subsequent subframe, and then performing a data resource element (RE) channel estimation; and according to the data RE channel estimation obtained from the combined NRS channel estimation, performing equalization, descrambling and de-rate matching on the non-real-time decoding subframe and the subsequent subframe respectively.

Therefore, the present disclosure can be applied to scenarios where data is not directly repeated, and is relatively insensitive to the fast-fading channel and the residual frequency offset.

BRIEF DESCRIPTION OF THE DRAWINGS

The features of the exemplary embodiments believed to be novel and the elements and/or the steps characteristic of the exemplary embodiments are set forth with particularity in the appended claims. The Figures are for illustration purposes only and are not drawn to scale. The exemplary embodiments, both as to organization and method of operation, may best be understood by reference to the detailed description which follows taken in conjunction with the accompanying drawings in which:

DETAILED DESCRIPTION OF THE EMBODIMENTS

The technical solutions of the present disclosure will be clearly and completely described below through embodiments with reference to drawings in the embodiments of the present disclosure. The described embodiments are a part of the embodiments of the present disclosure, rather than all the embodiments.

The present disclosure is applied to a non-real-time decoding system, especially a non-real-time decoding system that does not directly repeat data. For example, the additional system information block 1 (SIB1) transmission mechanism is introduced by the Narrow-Band Internet of Things (NB-IoT) system in Release 15. For scenarios where data is directly repeated, the symbol-level combination of received data in the time domain or frequency domain is a more concise solution.

In the network system, there is often a scenario where a data block is divided into several subframes for transmission, and decoding often occurs after the data block is completely received, so not every subframe needs to be decoded, and in these subframes that do not need to be decoded frame, the equalization result does not need to be used for real-time decoding of the current subframe.

Before introducing the embodiments of the present disclosure, in order to facilitate the understanding of the difference between the present disclosure and the conventional method, the general process of the OFDM communication system is mentioned in the literature "MIMO-OFDM Wireless Communications with Matlab", and the general sending and receiving process of NB-IoT is mentioned in the literature "A Tutorial on NB-IOT Physical Layer Design" and the literature "An Efficient Downlink Receiver Design for NB-IoT". Compared with the traditional method, the idea of present disclosure is to the equalization and subsequent processing of these non-real-time decoding subframes are postponed until subsequent subframes, so that the channel estimation result combined with the channel estimations of subsequent subframes can be used. In addition, the present disclosure is applied to a non-real-time decoding system, especially a non-real-time decoding system that does not directly repeat data.

The channel bandwidth in an OFDM communication system is composed of a plurality of resource blocks (RBs), wherein a plurality of continuous subcarriers form a resource block. A resource element (RE) is defined as a subcarrier (frequency domain) on one OFDM symbol (time domain).

Figure 1:
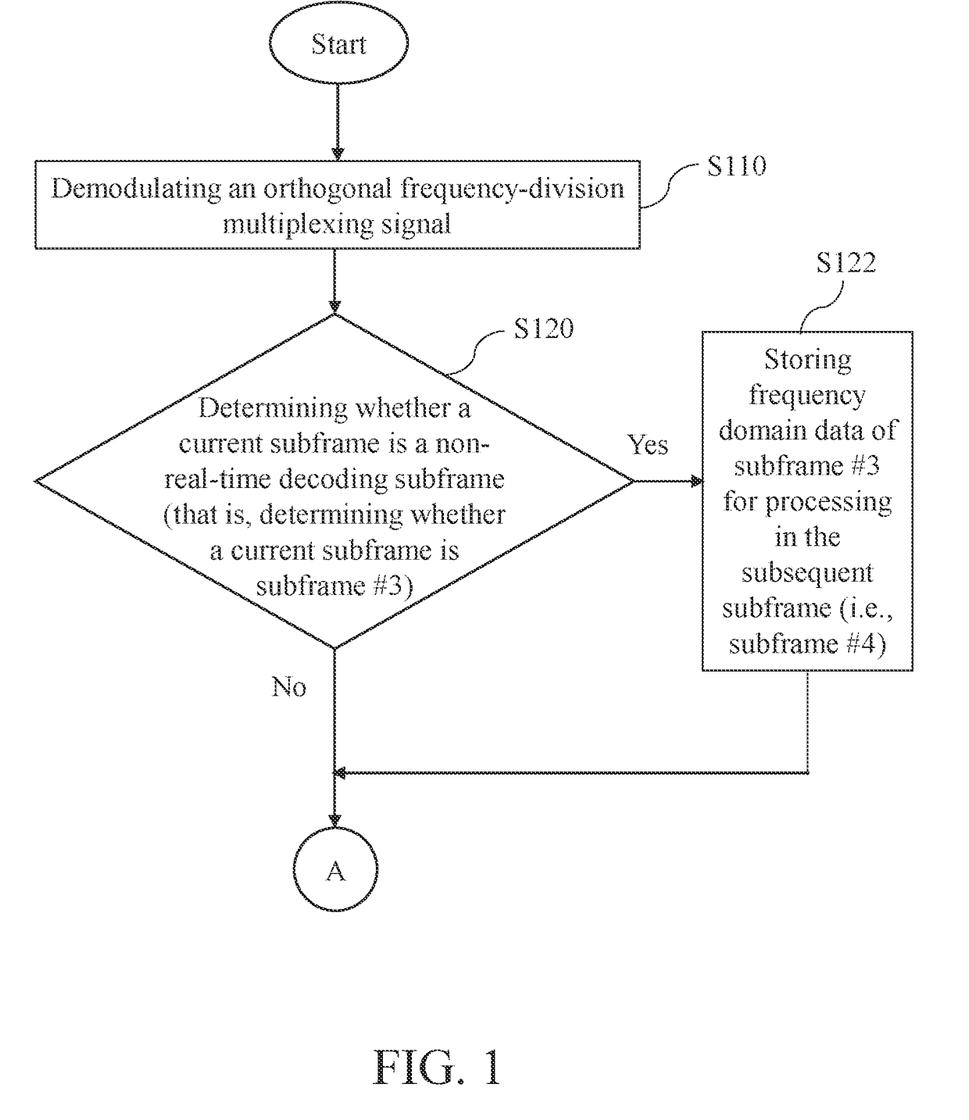
FIG. 1 is a receiving flow chart of a non-real-time decoding method of according to an embodiment of the present disclosure.

Regarding an embodiment of the present disclosure, the present disclosure is not limited to the additional SIB1, but for the convenience of understanding, the additional SIB1 is taken as an example to set forth the embodiments of the present disclosure, please refer to FIG. 1.

Specifically, when the additional SIB1 starts, the repetition is 16, and the period is 2560 ms. That is to say, a complete SIB1 data block comprises 16 SIB1 subframes, and the data structure of the SIB1 data are that: one repetition time span is 160 ms, the legacy SIB1 is transmitted on the subframe with index number 4 of every other frame, and when the additional SIB1 mechanism is enabled, the subframe with index number 3 in front of the subframe with index number 4 also carries the data of SIB1-NB. In Chapter 10.2.6 of the literature "A Tutorial on NB-IOT Physical Layer Design" of 3GPP TS 36.211, it is mentioned that when the additional SIB1 is received, in the StandAlone mode, the narrowband reference signals (NRSs) exist in subframe #0, #1, #3, #4, subframe #9 not containing NSSS; in the InBand mode, the narrowband reference signals exist in subframes #0, #4, subframe #9 not containing NSSS, and subframe #3 carrying SIB1. Therefore, it cannot be assumed that there is an NRS at the position of the interval one subframe before subframe #3 of transmitting SIB1. Considering that in the additional SIB1, a complete SIB1 data block contains 16 SIB1 subframes, the complete data block is often not received on subframe #3, and no decoding is required, the present disclosure considers that only the NRS channel estimation is performed on subframe #3, after the NRS channel estimations of subframe #3 and subframe #4 are combined on adjacent subframe #4 and the data RE channel estimation is performed, equalization and subsequent operations are performed on the stored frequency domain data on subframe #3, and other operations of subframe #4 remain unchanged.

As shown in FIG. 1, a non-real-time decoding method applied in a wireless communication system is provided. The wireless communication system comprises a transmitter and a receiver corresponding thereto, and the non-real-time decoding method is to solve the technical problem that symbol-level combination cannot be performed before channel estimation and equalization if the data on two subframes is not simply repeated. In addition, the non-real-time decoding method is relatively insensitive to fast-fading channel and the residual frequency offset than combining adjacent subframes as much as possible.

Please refer to FIG. 1, wherein the receiver executes the non-real-time decoding method, which comprises the following steps: after determining that a current subframe is a non-real-time decoding subframe, performing a NRS channel estimation of the non-real-time decoding subframe, and storing frequency domain data of the current subframe for equalization and related processing in the subsequent subframe; after determining that the current subframe is a subsequent subframe adjacent to the non-real-time decoding subframe, combining the NRS channel estimation of the non-real-time decoding subframe and a NRS channel estimation of the subsequent subframe on the subsequent subframe, and then performing a data RE channel estimation; and according to the data RE channel estimation obtained from the combined NRS channel estimation, performing equalization, descrambling and de-rate matching on the non-real-time decoding subframe and the subsequent subframe respectively.

Figure 2:
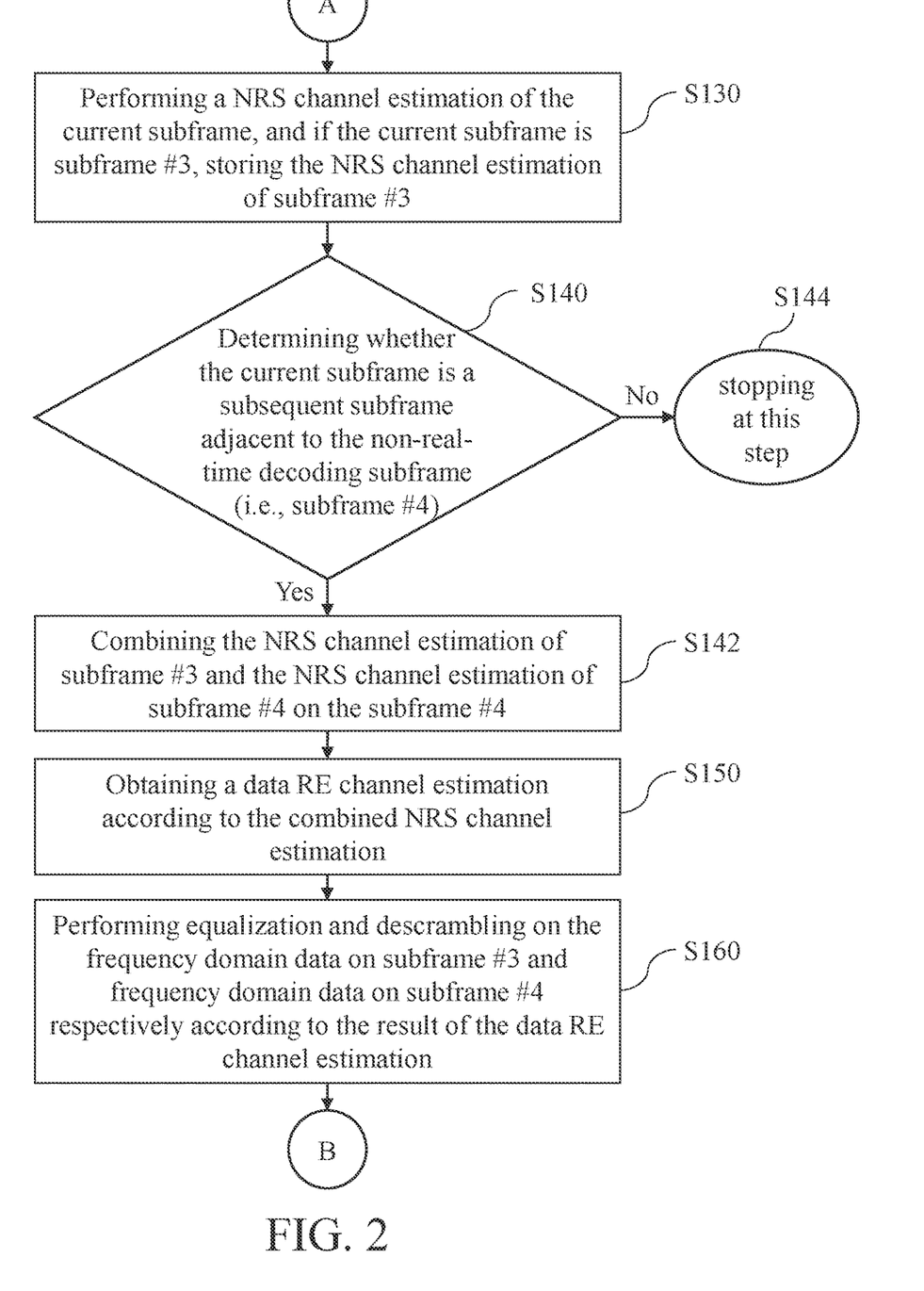
FIG. 2 is a receiving flow chart of the non-real-time decoding method continuing to FIG. 1.
Figure 3:
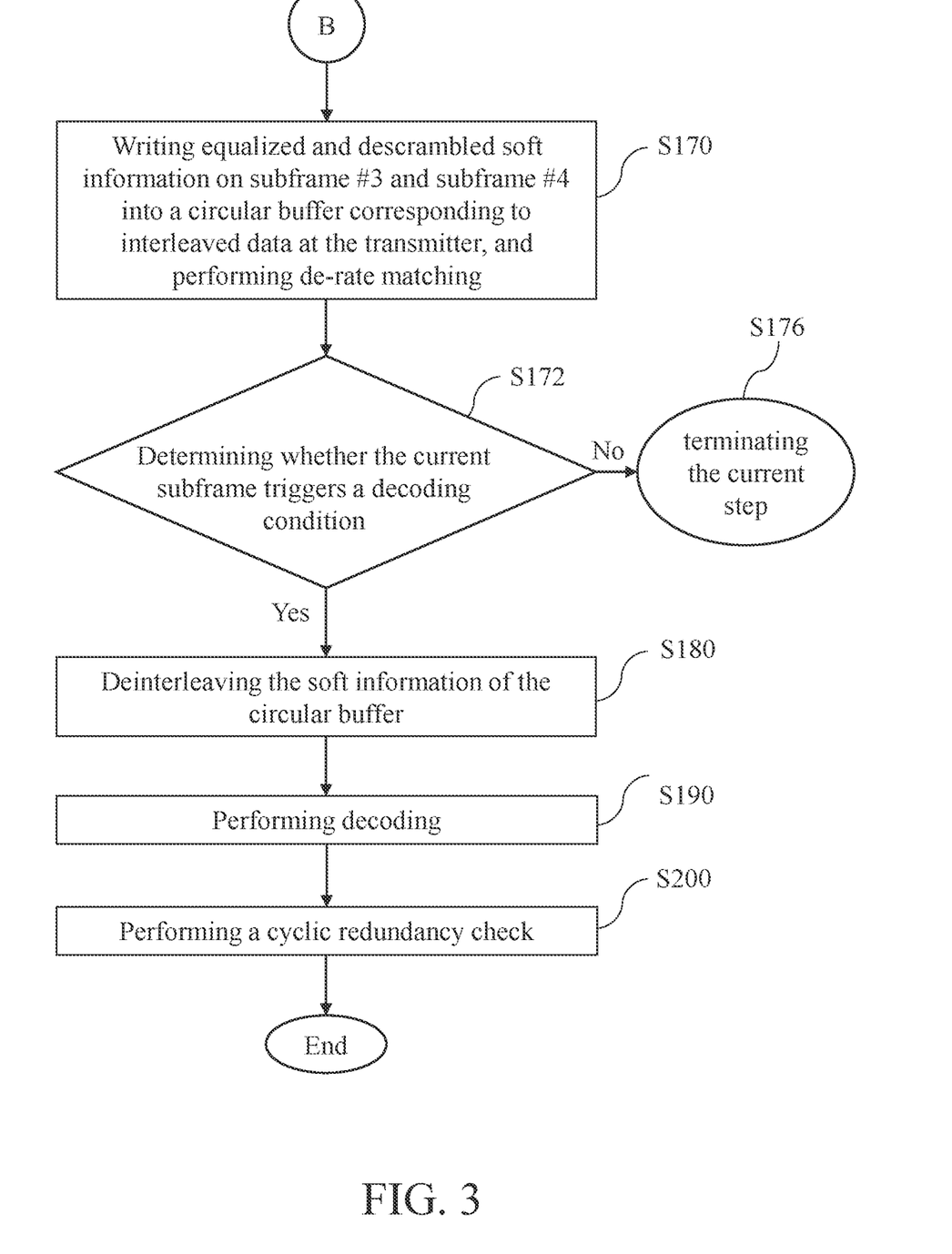
FIG. 3 is a receiving flow chart of the non-real-time decoding method continuing to FIG. 2.

Specifically, please refer to FIG. 1 to FIG. 3, when the receiving end executing a process optimization method of the non-real-time decoding system, the non-real-time decoding method comprises the following steps. For simplicity, following description is only made for subframe #3 and subframe #4 comprising SIB1.

In step S110, an orthogonal frequency-division multiplexing (OFDM) signal is demodulated first.

In step S120, it is determined whether a current subframe is a non-real-time decoding subframe. It means to determine whether the current subframe is the subframe with index number 3 (i.e., subframe #3). If yes (that is, the current subframe is subframe #3), frequency domain data is stored for processing in the subsequent subframe (i.e., the subframe with index number 4, subframe #4) (step S122). Step S130 is executed after the storage is completed. If not (that is, the current subframe is subframe #4), there is no need to store frequency domain data, and the flow directly goes to step S130.

In step S130, a NRS channel estimation of the current subframe is performed. If the current subframe is subframe #3, the NRS channel estimation is stored.

In step S140, it is determined whether the current subframe is a subsequent subframe adjacent to the non-real-time decoding subframe (i.e., whether the current subframe is subframe #4). If yes, combine the NRS channel estimation of subframe #3 and the NRS channel estimation of subframe #4 on the subframe #4 (step S142).

If the current subframe is subframe #3, the flow is executed to step S140 (step S144). If the current subframe is subframe #4, the flow continues to execute the following steps.

In step S150, a data RE channel estimation is obtained according to the combined NRS channel estimation.

In step S160, according to the result of the data RE channel estimation, equalization and descrambling are performed on the frequency domain data on subframe #3 and frequency domain data on subframe #4 respectively.

In step S170, equalized and descrambled soft information on subframe #3 and subframe #4 is written into a circular buffer corresponding to interleaved data at the transmitter, and de-rate matching is performed.

It is determined whether the current subframe triggers a decoding condition (step S172), and the decoding triggering condition comprises receiving a complete data block. If yes, the flow continues to execute the following steps. If not, the processing of the current subframe is terminated (step S176).

In step S180, the soft information of the circular buffer is deinterleaved.

In step S190, decoding is performed.

In step S200, a cyclic redundancy check (CRC) is performed.

Figure 4:
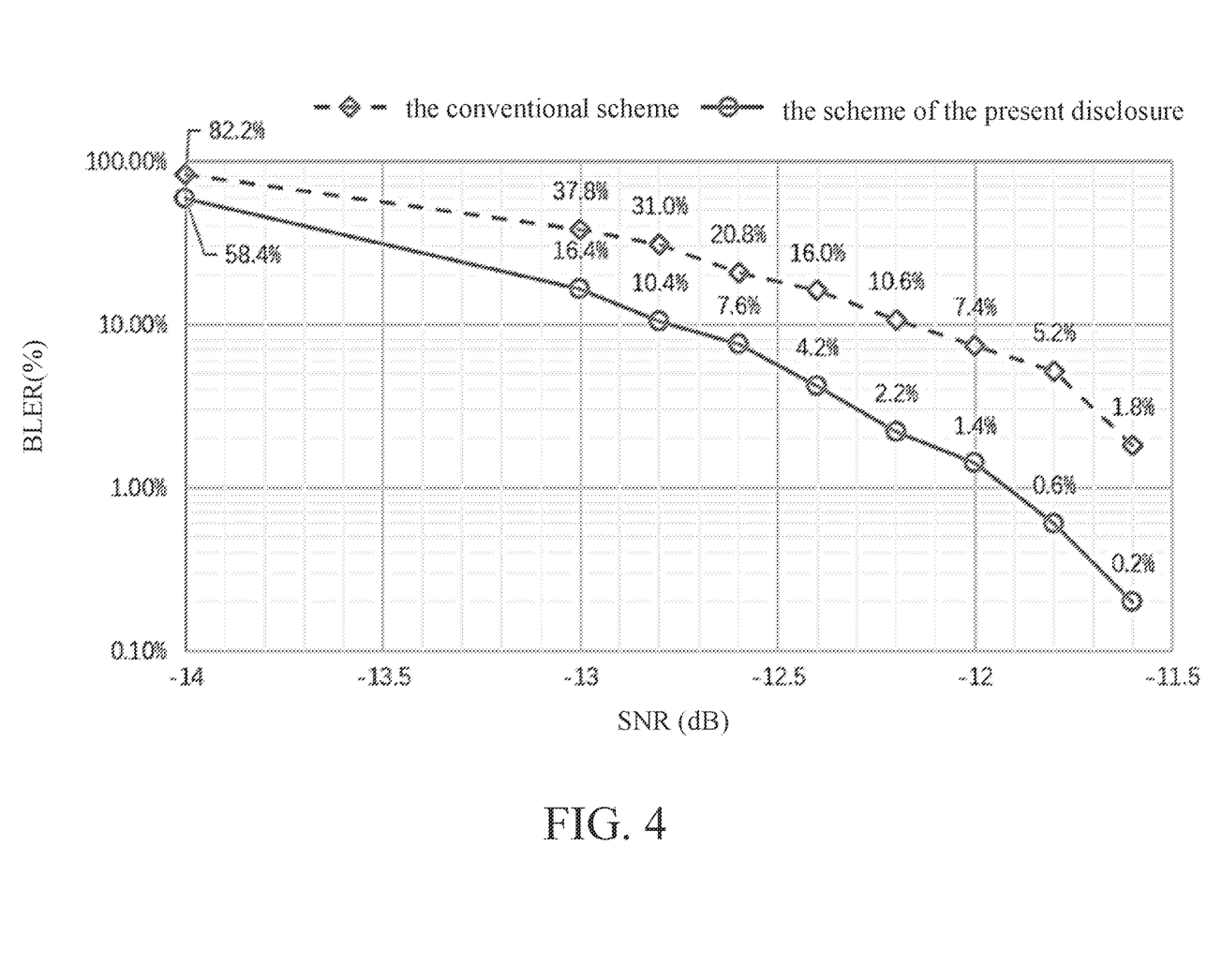
FIG. 4 is a performance comparison chart of using the scheme of the present disclosure and the conventional scheme when TBS=208 bits.
Figure 5:
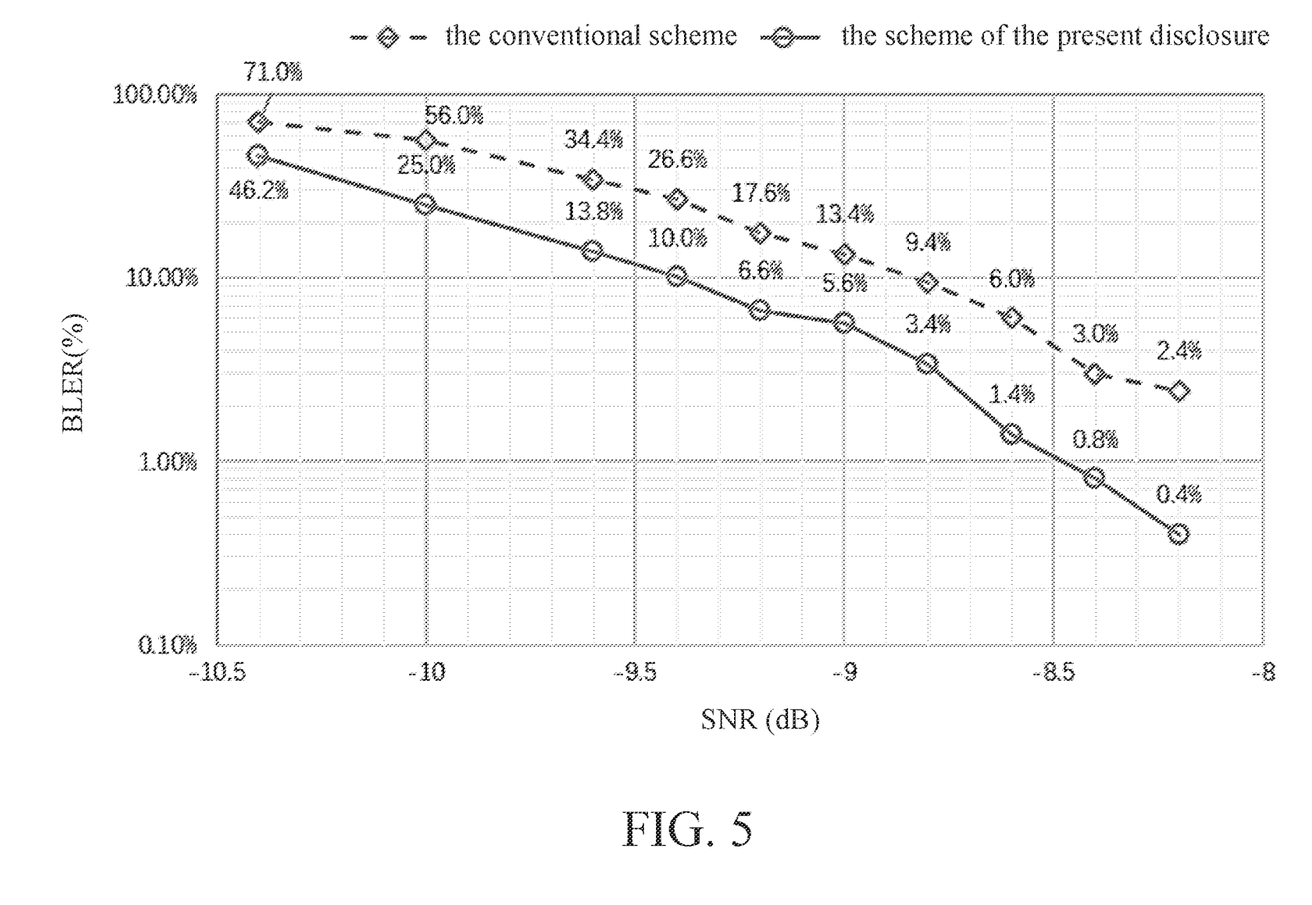
FIG. 5 is a performance comparison chart of using the scheme of the present disclosure and the conventional scheme when TBS=680 bits.

Please refer to FIG. 4 and FIG. 5 for the simulation effect. The transport block size (TBS) configuration under the additional SIB1 is as described in Table 16.4.1.5.2-1 of the literature "3GPP, TS 36.213: 'Evolved Universal Terrestrial Radio Access (EUTRA): Physical channels and modulation (R15)', 2018". The largest and smallest TBS are selected for illustration. FIG. 4 and FIG. 5 are performance comparison charts of using the scheme of the present disclosure and the conventional scheme when TBS=208 bits and TBS=680 bits respectively. The simulation conditions are that: InBand mode, dual antennas, the channel being ETU, the doppler extension being 5 Hz, and the frequency offset being 50 Hz.

It can be seen that when 5% BLER (block error rate) is reached at TBS=208 bits, the signal-to-noise ratio (SNR) required by the scheme of the present disclosure is about 0.6 dB lower than that of the conventional scheme; when 5% BLER is reached at TBS=680 bits, the SNR required by the scheme of the present disclosure is about 0.4 dB lower than that of the conventional scheme. Since the SNR requirement for BLER 5% of additional SIB1 transmission is low, and the transmission subframes with NRS are relatively sparse, the channel estimation of combining one more subframe achieves considerable performance gain.

Figure 6:
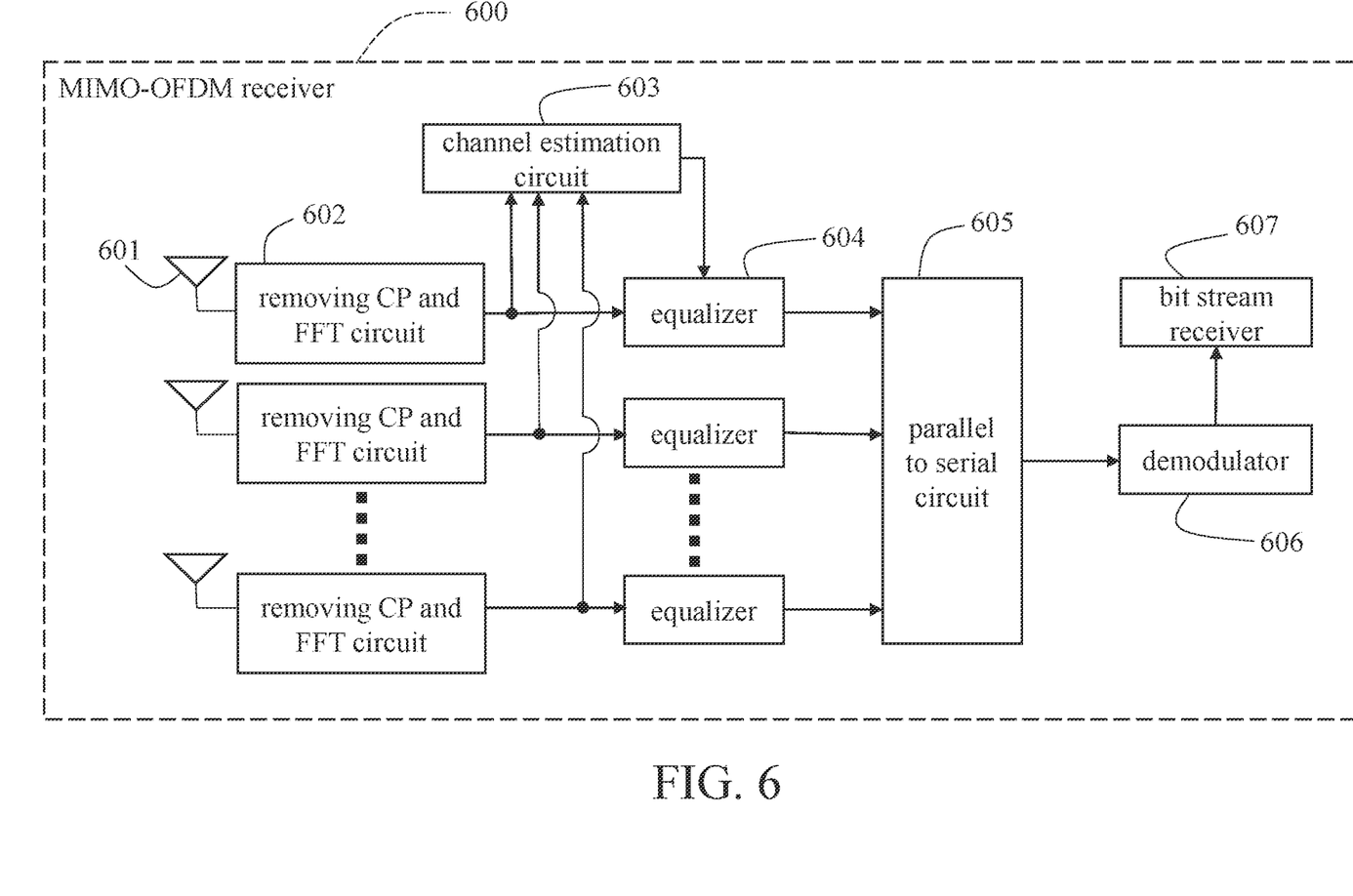
FIG. 6 is a schematic diagram of a MIMO-OFDM device applying a non-real-time decoding method of the present disclosure.

As shown in FIG. 6, the non-real-time decoding method of the present disclosure can be applied in a MIMO-OFDM receiver 600, and the MIMO-OFDM receiver 600 comprises a plurality of antennas 601, a plurality of removing cyclic prefix (CP) and Fast Fourier Transform (FFT) circuit 602, a channel estimation circuit 603, a plurality of equalizers 604, a parallel to serial (P/S) circuit 605, a demodulator 606 and a bit stream receiver 607. The non-real-time decoding method of the present disclosure can be implemented by the equalizers 604 in the MIMO-OFDM receiver 600, which improves the result of channel estimation used inside the equalizer.

In summary, since only the NRS channel estimation is performed on subframe #3, the data RE channel estimation is not performed on subframe #3, and the data RE channel estimation is only performed on subframe #4, from the perspective of a pair of subframes #3 and subframe #4, the present disclosure saves one data RE channel estimation compared with the conventional process, and the overall processing expense is reduced. The present disclosure can be applied to scenarios where data is not directly repeated, reduce processing cost while improving performance, and is relatively insensitive to fast-fading channel and the residual frequency offset.

The foregoing description illustrates and describes several preferred embodiments of the present disclosure. However, it should be understood that the present disclosure is not limited to the form disclosed herein, should not be regarded as an exclusion of other embodiments, but may be used in a variety of other combinations, modifications, and environments, and can be modified within the scope of the invention concept described herein, by the above teachings or related fields of technology or knowledge. Modifications and variations made by those skilled in the art without departing from the spirit and scope of the present disclosure should fall within the scope of the present disclosure defined by the appended claims.

What is claimed is:

1. A non-real-time decoding method, applied in a wireless communication system, the wireless communication system comprising a transmitter and a receiver corresponding thereto, the receiver executing the non-real-time decoding method, which comprising the following steps:

after determining that a current subframe is a non-real-time decoding subframe, performing a NRS (Narrowband Reference Signal) channel estimation of the non-real-time decoding subframe, and storing frequency domain data of the current subframe;

after determining that the current subframe is a subsequent subframe adjacent to the non-real-time decoding subframe, combining the NRS channel estimation of the non-real-time decoding subframe and a NRS channel estimation of the subsequent subframe on the subsequent subframe, and then performing a data resource element (RE) channel estimation; and according to the data RE channel estimation obtained from the combined NRS channel estimation, performing equalization, descrambling and de-rate matching on the non-real-time decoding subframe and the subsequent subframe respectively.

2. The non-real-time decoding method according to claim 1, wherein after the step of determining that the current subframe is the non-real-time decoding subframe, the non-real-time decoding method further comprises the step of storing frequency domain data on data REs of the non-real-time decoding subframe for subsequent subframe processing.

3. The non-real-time decoding method according to claim 1, wherein after the step of performing the NRS channel estimation of the non-real-time decoding subframe, it is determined whether the current subframe is the subsequent subframe; if not, execution of subsequent steps is terminated.

4. The non-real-time decoding method according to claim 1, wherein, in the step of performing the data RE channel estimation, the combined NRS channel estimation is used for the data RE channel estimation.

5. The non-real-time decoding method according to claim 1, wherein, in the step of performing de-rate matching, equalized and descrambled soft information on the non-real-time decoding frame and the subsequent subframe is written into a circular buffer corresponding to interleaved data at the transmitter.

6. The non-real-time decoding method according to claim 5, wherein, after the step of performing de-rate matching, it is determined whether the current subframe triggers a decoding condition; and if so, the receiver continues to execute next steps.

7. The non-real-time decoding method according to claim 6, wherein when the receiver determines that the current subframe triggers the decoding condition, the receiver performs deinterleaving on the soft information of the circular buffer.

8. The non-real-time decoding method according to claim 7, wherein the receiver performs decoding on the soft information in the circular buffer after performing deinterleaving.

9. The non-real-time decoding method according to claim 8, wherein after performing decoding, the receiver performs a cyclic redundancy check on the decoded soft information.

10. The non-real-time decoding method according to claim 1, wherein, in the step of performing equalization, the receiver simultaneously processes previously stored frequency domain data adjacent to the non-real-time decoding subframe.

11. A receiver, comprising:
a plurality of antennas, configured to receive subframes; and
a plurality of equalizers, configured to execute a non-real-time decoding method based on the subframes, wherein the non-real-time decoding method comprises the following steps:
after determining that a current subframe is a non-real-time decoding subframe, performing a NRS (Narrowband Reference Signal) channel estimation of the non-real-time decoding subframe, and storing frequency domain data of the current subframe;
after determining that the current subframe is a subsequent subframe adjacent to the non-real-time decoding subframe, combining the NRS channel estimation of the non-real-time decoding subframe and a NRS channel estimation of the subsequent subframe on the subsequent subframe, and then performing a data resource element (RE) channel estimation; and
according to the data RE channel estimation obtained from the combined NRS channel estimation, performing equalization, descrambling and de-rate matching on the non-real-time decoding subframe and the subsequent subframe respectively.

12. The receiver according to claim 11, wherein after determining that the current subframe is the non-real-time decoding subframe, the plurality of equalizers further store frequency domain data on data REs of the non-real-time decoding subframe for subsequent subframe processing.

13. The receiver according to claim 11, wherein after the plurality of equalizers perform the NRS channel estimation of the non-real-time decoding subframe, it is determined whether the current subframe is the subsequent subframe; if not, the plurality of equalizers terminate execution of subsequent steps.

14. The receiver according to claim 11, wherein, when the plurality of equalizers perform the data RE channel estimation, the combined NRS channel estimation is used for the data RE channel estimation.

15. The receiver according to claim 11, wherein, when the plurality of equalizers perform de-rate matching, equalized and descrambled soft information on the non-real-time decoding frame and the subsequent subframe is written into a circular buffer corresponding to interleaved data at a transmitter.

16. The receiver according to claim 15, wherein, after the plurality of equalizers perform de-rate matching, it is determined whether the current subframe triggers a decoding condition; and if so, the plurality of equalizers continues to execute next steps.

17. The receiver according to claim 16, wherein when the plurality of equalizers determine that the current subframe triggers the decoding condition, the plurality of equalizers perform deinterleaving on the soft information of the circular buffer.

18. The receiver according to claim 17, wherein the plurality of equalizers perform decoding on the soft information in the circular buffer after performing deinterleaving.

19. The receiver according to claim 18, wherein after performing decoding, the plurality of equalizers perform a cyclic redundancy check on the decoded soft information.

20. The receiver according to claim 19, wherein, when the plurality of equalizers perform equalization, the plurality of equalizers simultaneously process previously stored frequency domain data adjacent to the non-real-time decoding subframe.

* * * * *